July 20, 1965
A. E. MOULTON
3,195,923
FRAMES FOR TWO-WHEELED CYCLE VEHICLES
Filed Nov. 19, 1962
3 Sheets-Sheet 1
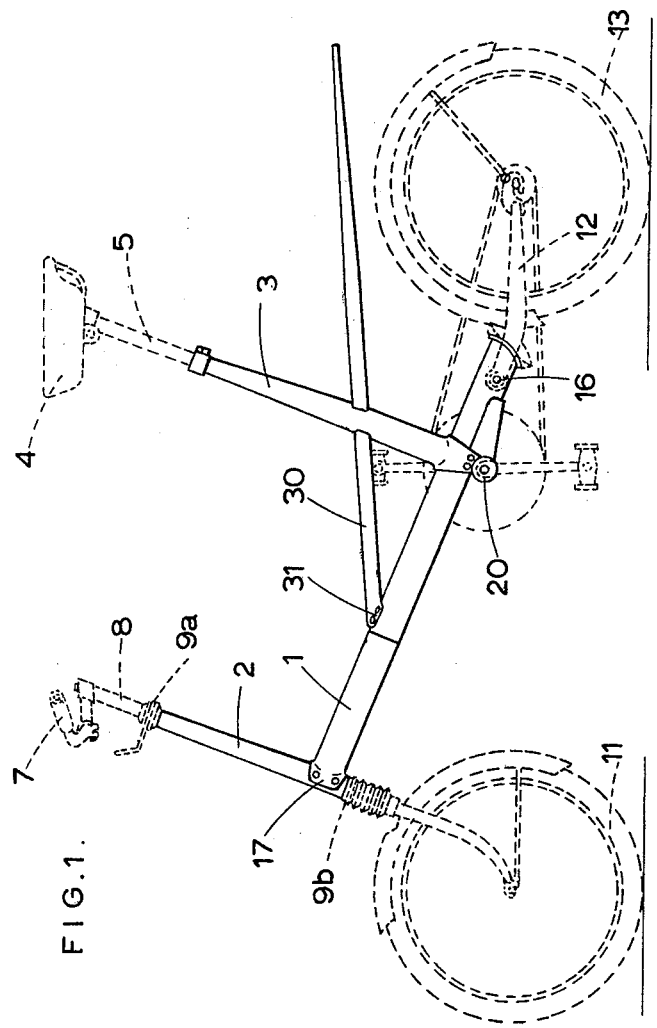
INVENTOR
ALEXANDER ERIC MOULTON
BY
ATTORNEYS July 20, 1965 A. E. MOULTON 3,195,923
FRAMES FOR TWO-WHEELED CYCLE VEHICLES
Filed Nov. 19, 1962 3 Sheets-Sheet 2
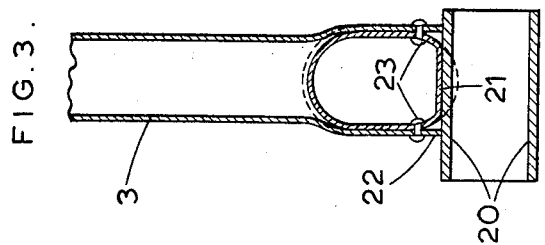
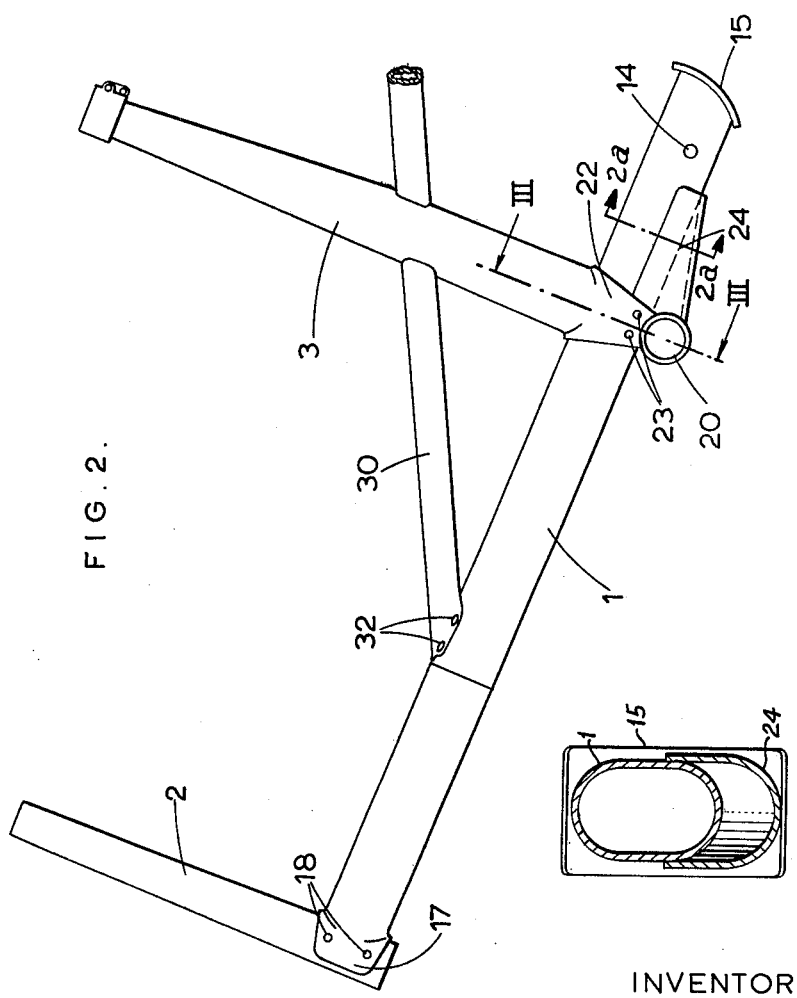
INVENTOR
ALEXANDER ERIC MOULTON
BY
Shoemaker and Mattare
ATTORNEYS July 20, 1965   A. E. MOULTON   3,195,923
FRAMES FOR TWO-WHEELED CYCLE VEHICLES
Filed Nov. 19, 1962   3 Sheets-Sheet 3

INVENTOR
ALEXANDER ERIC MOULTON
BY
ATTORNEYS

United States Patent Office 3,195,923
Patented July 20, 1965

3,195,923
FRAMES FOR TWO-WHEELED CYCLE VEHICLES
Alexander Eric Moulton, Bradford-on-Avon, England, assignor to Moulton Consultants Limited, Bradford-on-Avon, England, a British company
Filed Nov. 19, 1962, Ser. No. 238,463
Claims priority, application Great Britain, Dec. 1, 1961, 43,068/61
8 Claims. (Cl. 280—281)

This invention relates to two-wheeled vehicles such as pedal bicycles and mopeds.

In the specification of my co-pending U.S. patent application S.N. 65,830, filed October 28, 1960, now Patent No. 3,083,039, there is described a two-wheeled cycle vehicle having front and rear rubber tyred wheels each of an overall diameter of between 12 and 19 inches, and having an F-shaped frame supported on said wheels comprising essentially a longitudinal backbone member extending from a point above the front wheel substantially towards, and it may be somewhat below, the rear wheel centre, said backbone terminating at a point ahead of the rear wheel, there being provided upstanding substantially at right angles from the backbone, from its front end a steering post for supporting a steering column surmounted by handlebars, and from a point intermediate of its length a seat tube surmounted by a saddle, there being also a housing for a pedal crank axle fixed directly to the underside of the backbone at a point below the junction of the seat tube with the backbone.

The present invention is concerned with improvements and modifications in the frame above described and particularly with effecting an efficient triangulation of the frame structure to strengthen the backbone at the point of maximum bending.

According to the present invention a frame for a bicycle is provided which comprises a tubular main frame member or backbone adapted to extend longitudinally of the vehicle downwardly inclined rearwardly thereof, the backbone having upstanding from its front end a front tube adapted to house a steering column and from a point intermediate of its length a seat tube adapted to be surmounted by a saddle, a housing for a pedal crank axle being adjoined to the underside of the backbone in contact therewith at a point immediately below the junction of the seat tube with the backbone, the frame also including a longitudinal bracing member extending from a point on the upper side of the backbone ahead of the seat tube, rearwardly to adjoin the seat tube at a position below its midpoint.

The housing for the pedal crank axle comprises a tubular member extending transversely of the frame and adhered directly to the underside of the backbone which latter is also tubular, there being adhered at both sides of said housing a bracket member which extends rearwardly and partially envelops the lower part of the backbone to which it is adhered, said bracket member serving to provide support during pedal thrusts both for the housing and for the part of the backbone extending rearwardly from the housing.

The longitudinal bracing member is preferably a single straight tube. Alternatively the member may comprise twin tubes, side by side, serving the function of the preferred single tube of larger section.

The longitudinal bracing member provides support for the seat tube relative to the backbone as well as supporting the latter at the point of maximum bending. The seat tube can therefore be of smaller diameter than if it were unsupported.

Additional advantages of or uses for the longitudinal member are:

(a) The longitudinal member provides a lifting handle at the centre of gravity of the machine.

(b) The part of the member extended rearwardly of the seat tube provides a base for a variety of rear carrying platforms and a suitable structure on which accessories can be mounted, for example, a rear light at its rearmost extremity, and on its respective sides, a tyre pump and a prop stand.

The part of the longitudinal member extending rearwardly from the seat tube may be supported either by a stay depending from the upper end of the seat tube or by a stay rising from the rear end of the backbone.

The backbone member may be forked at its rear end to mount the rear wheel spindle, although preferably, it is terminated at a point ahead of the wheel, the latter being carried on a trailing arm structure pivoted to the backbone and resiliently supported thereagainst.

The front wheel is preferably resiliently supported with respect to the steering post.

Preferably the backbone is formed of hollow tubing which has a greater depth than width and advantageously its cross section is that of a flat sided oval or ellipse having its minor axis horizontal.

Alternatively the backbone may be formed from a plurality of tubes clustered together, and advantageously two or more tubes are employed, attached together and superimposed one above another.

The backbone, the seat tube and the steering post may be either light alloy extrusions or the tubes may be formed from steel pressings joined together to form tubes.

The backbone may be in two parts so as to be collapsible or able to be hinged for storage or transportation.

The invention will now be described with reference to the accompanying drawings in which:

FIGURE 1 is a simplified side view of one embodiment of a bicycle having a frame according to the invention shown in full lines while the remainder of the machine is shown in dotted lines.

FIGURE 2 is a detail side view of the frame of FIGURE 1.

FIGURE 2a is a cross-section taken on line 2a—2a of FIGURE 2.

FIGURE 3 is a cross sectional view to larger scale taken on the line III—III of FIGURE 2.

FIGURE 4 is a side view of an arrangement by which the backbone is made in sections which are separable while

Figure 4:
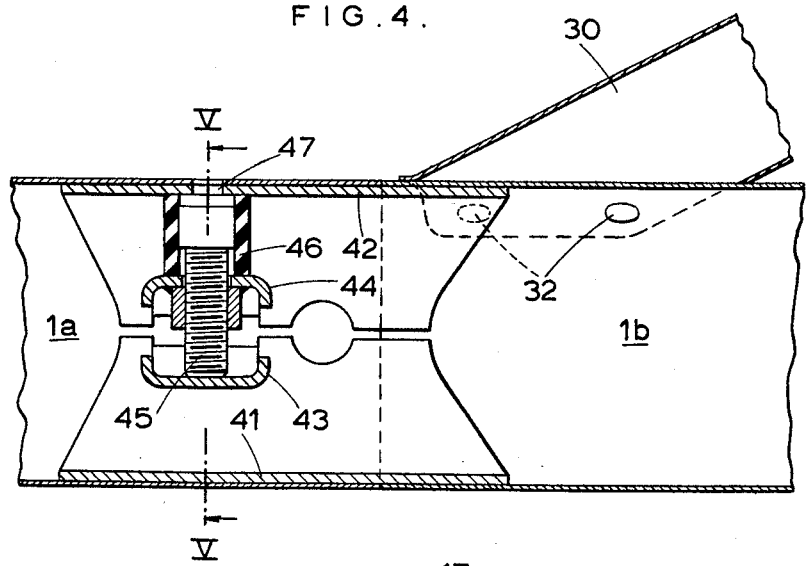

Referring now to FIGURE 1, a bicycle with front and rear rubber tyred wheels 11 and 13 respectively of 12 to 19 inches overall diameter, is provided with a frame comprising a backbone 1, extending from a point above the front wheel 11, substantially in a straight line (when viewed in plan) towards the spindle of the rear wheel 13. A housing 20 for a pedal crank axle is adjoined directly to the underside of the backbone 1.

The backbone 1 has upstanding from it substantially at right angles, from its front end above the front wheel 11, a steering post 2 for supporting, by bearings 9a and 9b, a steering column carried within the post 2 for relative rotation. At the upper end of the steering column handlebars 7 are mounted on a stem 8. From a point above the housing 20 for the pedal crank axle a seat tube 3 upstands substantially at right angles from the backbone 1. A seat or saddle 4 is carried on a stem 5 at the upper end of the tube 3.

The front end of the backbone 1 is shaped at each side with an integral ear 17, to constitute a "cod" mouth partially embracing the steering post 2. The ears 17 are first accurately located with respect to the post 2 by pop rivets 18 or spot welds. The ears 17 are then adhered to the post 2 by brazing or alternatively by an adhesive cement.

As will be seen from FIGURES 2 and 3, the cross section of the backbone 1 is that of a flat sided oval with its minor axis horizontal. At its juncture with the housing 20 for a pedal crank axle the underside of the backbone is "dimpled" as indicated at 21 in such manner that the generally cylindrical housing 20 fits snugly into the concavity of the dimple 21 and is fixed therein, by brazing or by an adhesive cement, over the full width of the backbone.

The lower end of the tube 3 is shaped at each side with an integral generally triangular ear 22 to constitute a "cod" mouth partially embracing the backbone 1. The ears 22 are first accurately located on either side of the backbone by pop rivets 23 or spot welds. This is followed by adhering the ears 22 to the backbone by brazing or adhesive. 24 is a bracket member brazed to the rear of the housing 20 which, extending rearwardly therefrom, partially embraces and is brazed to the backbone 1.

A longitudinal bracing member 30 extends from a point 31 on the upper side of the backbone 1 rearwardly to adjoin the seat tube at a position below the midpoint of the latter. The point 31 will be spaced from the seat tube at a distance equal to at least one third of the distance separating the seat tube 3 from the front post 2. As shown the member 30 is preferably straight and passes through the seat tube 3 to which it is brazed. The front end of the member 30 is first accurately located on the backbone 1 by pop rivets 32 or spot welds and then adhered by brazing. It may be terminated just in rear of the tube 3 or it may, as shown in FIGURE 1, extend rearwardly from the tube 3 over a greater distance than it extends forwardly therefrom to terminate above the rearmost part of the rear wheel 13. The member 30 will provide support for the seat tube 3 and will strengthen the frame by completing triangulation between the backbone 1 and the seat tube 3. The part of the member 30 extending rearwardly from the seat tube 3 will provide means for mounting a luggage rack or carrier above the rear wheel. It may also serve to mount accessories such as a tyre pump, a rear light and a prop stand for the vehicle.

It will be noted that the backbone 1 extends rearwardly from the seat tube 3 over a distance equal to at least one quarter of the distance separating the tubes 2 and 3. The rear end of the backbone is closed by an end plate 15 while an aperture 14 is provided for the purpose of mounting a suspension system for the rear wheel as described below.

As shown in FIGURE 1 the steering post 2 and the seat tube 3 each taper upwardly and each extend upwardly over a distance equal to at least half the distance separating them. When the vehicle is upright they each terminate at approximately the same height from the ground. By conferring these members with the length specified the steering post will provide adequate support for a resilient telescopic suspension and steering assembly for the front wheel while the seat tube will provide support with a large range of height adjustment for the saddle 4 on its stem 5.

It will be noted that the juncture of the frame members does not involve the socket lug joints conventionally used for cycle frames, which are expensive; nor does it necessitate in the region of the junctions the piercing or aperturing of the backbone whose structural strength is not thereby impaired. As stated above preferably the method of joining the tubes is by brazing, the members being first correctly and accurately located by pop riveting or spot welding.

One of the main characteristic features of the invention is also apparent from these figures, namely, the feature of the housing 20 being attached directly to the underside of the backbone, as opposed to being located some distance below it. The bracket 24 ensures the torsional rigidity of the housing 20 and of the rear part of the backbone during pedal thrusts in a simple and economical manner. The fact that less metal is used in the frame of the bicycle according to the invention enables the frame to be cheaper to manufacture and lighter in weight than the frame of a conventional "safety" bicycle.

The arrangement of the rear wheel suspension system shown in dotted lines in FIGURE 1 comprises a fabricated trailing arm structure 12 pivotally carried on a bearing 13 mounted in the aperture 14 near the rear end of the backbone 1. Both the front and rear wheels are preferably resiliently mounted with respect to the frame by means including rubber springs.

Figure 5:
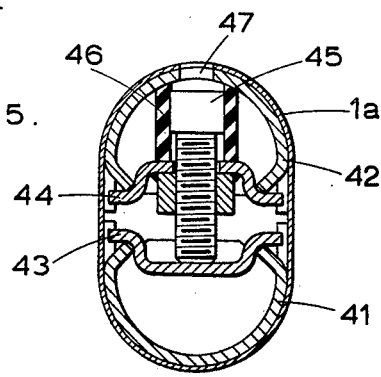
FIGURE 5 is a cross sectional view taken on the line V—V of FIGURE 4.

Referring now to FIGURES 4 and 5, preferred means are shown for enabling the machine to be collapsed into two separate sections capable of being stowed separately. This provision may be made since two separate "packages" are in many instances more convenient to stow than for example if the bicycle were capable of being folded into two sections which remain attached together in the folded condition.

The means comprise providing the backbone 1 with a break to form two sections 1a and 1b. Either section, but in the drawings the section 1b is provided with sleeve means adhered within its cross section and adapted to be insertable into the interior of the other section.

The sleeve means is in two complementary parts 41 and 42 and part of the mouth of each part is bridged by a member 43, 44. The member 44 of sleeve part 42 is formed with a threaded aperture in which there is a socket screw 45 which bears against the member 43. On rotation of the screw 45 the members can be expanded or contracted into or out of engagement with the interior surface of the wall of section 1a. Access to the head of the screw 45 is through an aperture 47 in the section 1a and a guide sleeve 46 for the screw 45 may be provided. When the backbone is to be collapsed provision will be made for readily disengaging the brake and gear cables from the front or from the rear section of the machine.

I claim:

1. A frame for a two-wheeled pedal cycle vehicle comprising a tubular main frame backbone adapted to extend longitudinally of the vehicle downwardly inclined rearwardly thereof, a front tube upstanding from the front end of the backbone and adapted to house a steering column, a seat tube upstanding from the backbone rearwardly spaced from the front tube and adapted to be surmounted by a saddle, a tubular housing for a pedal crank axle extending transversely of and adhered to the underside of the backbone at a point immediately below the junction of the seat tube and backbone, a bracket member adhered to side portions of said housing and extending rearwardly and partially enveloping and adhered to the lower part of the backbone, said bracket member serving to provide support during pedal thrusts for the housing relative to the backbone, and a substantially straight longitudinal bracing member extending from a point on the upper side of the backbone ahead of the seat tube at a distance equal to at least one third of the distance separating the seat tube from the front tube rearwardly to adjoin the seat tube at a position below the midpoint thereof.

2. A frame according to claim 1 wherein the backbone extends rearwardly from the seat tube over a distance equal to at least one fourth of the distance separating the seat tube from the front tube.

3. A frame for a two-wheeled pedal cycle as set forth in claim 1 wherein said backbone forms the sole frame member connecting the front tube with the remainder of the frame and being formed of two interengaging front and rear sections which are separable one from the other at a point ahead of the junction of the longitudinal bracing member with the backbone.

4. A frame for a two-wheeled pedal cycle vehicle comprising a tubular main frame backbone adapted to extend longitudinally of the vehicle downwardly inclined rearwardly thereof, a front tube upstanding from the front end of the backbone and adapted to house a steering column, a seat tube upstanding from the backbone rearwardly spaced from the front tube and adapted to be surmounted by a saddle, the front tube and the seat tube tapering upwardly and extending upwardly from the backbone over a height equal to at least half the distance separating them, a housing for a pedal crank axle adjoined to the underside of the backbone in contact therewith immediately below the junction of the seat tube with the backbone, and a substantially straight longitudinal bracing member extending from a point on the upper side of the backbone ahead of the seat tube at a distance equal to at least one third of the distance separating the seat tube from the front tube rearwardly to adjoin the seat tube at a position below the midpoint thereof.

5. A frame for a two-wheeled pedal cycle as set forth in claim 4 wherein said backbone forms the sole frame member connecting the front tube with the remainder of the frame and being formed of two interengaging front and rear sections which are separable one from the other at a point ahead of the junction of the longitudinal bracing member with the backbone.

6. A frame for a two-wheeled pedal cycle vehicle comprising a tubular main frame backbone adapted to extend longitudinally of the vehicle downwardly inclined rearwardly thereof, a front tube upstanding from the front end of the backbone and adapted to house a steering column, a seat tube upstanding from the backbone rearwardly spaced from the front tube and adapted to be surmounted by a saddle, a housing for a pedal crank axle adjoined to the underside of the backbone in contact therewith immediately below the junction of the seat tube with the backbone, and a single straight longitudinal bracing tube extending rearwardly from a point on the upper side of the backbone ahead of the seat tube at a distance equal to at least one third of the distance separating the seat tube from the front tube through and adhered to the seat tube at a position below the midpoint thereof to provide support therefor, said bracing tube extending rearwardly from the seat tube a greater distance than it extends forwardly therefrom and providing a base for a carrying platform or the like.

7. A frame according to claim 6 wherein the longitudinal bracing tube extends rearwardly from the seat tube and terminates at a point above the rearmost part of a rear wheel of the vehicle.

8. A frame for a two-wheeled pedal cycle as set forth in claim 6 wherein said backbone forms the sole frame member connecting the front tube with the remainder of the frame and being formed of two interengaging front and rear sections which are separable one from the other at a point ahead of the junction of the longitudinal bracing member with the backbone.

References Cited by the Examiner

UNITED STATES PATENTS

| 1,563,094 | 11/25 | Ledig | 280—281 X |
| 2,645,509 | 7/53 | Valenta | 287—2 |
| 2,755,103 | 7/56 | Douglas | 280—281 |
| 2,861,815 | 11/58 | Willinger | 280—278 |
| 3,083,039 | 3/63 | Moulton | 280—277 |

FOREIGN PATENTS

| 839,373 | 1/39 | France. |
| 877,952 | 9/42 | France. |
| 1,017,589 | 9/52 | France. |
| 1,067,001 | 1/54 | France. |
| 1,196,686 | 5/59 | France. |
| 1,201,261 | 7/59 | France. |
| 560,709 | 4/57 | Italy. |
| 104,086 | 3/42 | Sweden. |

A. HARRY LEVY, *Primary Examiner.*